Patented Dec. 4, 1934

1,982,992

UNITED STATES PATENT OFFICE 1,982,992

PROCESS FOR PURIFYING USED MINERAL LUBRICATING OILS

Ferdinand Joseph Friedrich Karthaus, Probolinggo, Java

No Drawing. Application January 23, 1933, Serial No. 653,194. In the Netherlands March 31, 1932

3 Claims. (Cl. 196—16)

With the processes hitherto used for purifying used mineral lubricating oils the soiled lubricating oil is treated with a soap solution, after which from this mixture by adding free alkali, the soap together with the impurities is precipitated.

Instead of a soap solution also soap forming substances as e. g. oil acid and free alkali are used.

After the separation of the oil it is necessary to wash it out with water for the removal of traces of free alkali. Sometimes also the dirty lubricating oil is heated previously, after which it is treated with tri-sodium phosphate or oil acid and sodium hydrate or soap solution after which it is separated by depositing or centrifuging and by fractionating is further purified.

This process has the drawback that it is not simple enough and therefore cannot be applied in those places, where used oil is not present in great quantities.

The invention has for its object to remove this drawback. The process for purifying used mineral lubricating oils according to the invention consists in adding to the lubricating oil which is to be purified for example one to three per cent. by volume of an emulsion which is obtained as follows:—First a colloidal combination is prepared by adding to oils, fats, waxes or resins, which are not soluble in mineral oils, anhydrous water soluble soap as disperse phase and by heating the mixture to such a high temperature that the soap forms with the dispersion agent a colloidal combination, which is then worked up with distilled water and with a solution of an inorganic or organic base or salt in distilled water to an emulsion. For the purification the mixture of the oil to be purified and the emulsion is then heated to 100° C.

With the processes which were hitherto used for the preparation of colloidal combinations from oils, fats, waxes, resins and soaps, lye and oil are added to the dispersion agent (oil, fat, wax or resin) of the disperse phase (soap), may be as such, but not in anhydrous condition or not as such but in the form of its elements. The colloidal combination which is thus obtained is therefore not anhydrous.

The process for the preparation of colloidal combinations as used according to the invention consists in the addition of an anhydrous, but water soluble soap as disperse phase to the dispersion agent, for which purpose oils, fats, waxes and resins, which are not soluble in mineral oils, come into consideration; this mixture is heated to such a high temperature, that the soap which as such is insoluble in the dispersion agent after preliminary alteration of its physical condition, characterized by an increase in volume (swelling) forms with the oil, the fat, the wax or the resin an anhydrous colloidal combination.

As dispersion agent come into consideration all oils, fats, waxes and resins of vegetable, animal or mineral origin, which form the above described characteristic combination with the disperse phase to a durable colloidal system, and which moreover are not soluble in mineral oils. Therefore generally oils which comply with the general formula $C_nH_{2n-2}O_3$ can be used of which as example can be mentioned castor oil and grape seed oil.

As disperse phase come into consideration all soaps belonging to the group "water soluble soaps", which moreover without decomposition can be brought into an anhydrous condition.

E. g. it is possible to add to one volume castor oil one half percent by weight of anhydrous soap, to heat this mixture till the soap is dissolved which takes place at about 250° C. (In case fats, oils, resins, waxes with a boiling point lower than 250° C. are used, the mass under pressure is heated to that temperature). After cooling down a colloidal combination is formed. By working up the colloidal combination in an emulsifier until cooled down to about 25° C., and adding successively an equal part by volume of distilled water, an emulsion results, to which after completing, five percent by weight of soda ($Na_2CO_3$) is added.

As an example one to three per cent. of such an emulsion is added to the oil to be purified and the mixture is heated to 100° C. The result of this treatment is that the colloidal carbon, which the soiled lubricating oil contains, flocculates out, whereas the acidity of the lubricating oil is neutralized by the alkalinity of the emulsion, by which salts are formed, which, however, are insoluble in mineral lubricating oils.

In this way in the lubricating oil which in the beginning was dirty a quickly depositing precipitation is formed which can be separated from the clear layer of lubricating oil, either by decanting after some 12 hours standing, or by clarifying in centrifugal oil-separators, immediately after a heating temperature of 100° C. has been reached. By both methods which give equal good results, 93 to 97 percent of pure, neutral lubricating oil is reclaimed.

With this simple process the use of often expensive oil filtering apparatus or separators is rendered superfluous, by which even the smallest machine works are in a position to purify and recover their soiled mineral lubricating oils.

Having now described my invention, what I claim as new and desire to secure by Letters Patent is:—

1. Process of purifying used mineral lubricating oils consisting in adding an emulsion to the oil to be purified, raising the temperature of the mixture, and removing the precipitated impurities from the oil, the emulsion employed being formed by dissolving at raised temperature an anhydrous soap in a vegetable oil non-miscible with the lubricating oil, emulsifying the product with distilled water and giving the emulsion when ready a slight alkalinity by the addition of a basic substance.

2. Process of purifying used mineral lubricating oils consisting in adding an emulsion to the oil to be purified, raising the temperature of the mixture, allowing the precipitated impurities to settle and decanting the purified oil, the emulsion employed being formed by dissolving anhydrous soap in castor oil at raised temperature, emulsifying the product with distilled water and giving the emulsion when ready a slight alkalinity with sodium carbonate.

3. Process of purifying used mineral lubricating oils consisting in adding from one to three per cent. by volume of an emulsion to the oil to be purified, raising the temperature of the mixture to about 100° C. allowing the precipitated impurities to settle, and decanting the purified oil, the emulsion employed being formed by dissolving an anhydrous water soluble soap in castor oil by heating up to about 250° C., emulsifying the product with distilled water and giving the emulsion an alkalinity by dissolving therein five per cent. by weight of sodium carbonate.

FERDINAND JOSEPH FRIEDRICH KARTHAUS.